Patented Mar. 22, 1932

1,850,225

UNITED STATES PATENT OFFICE

WILLARD DEC. CRATER, OF SUCCASUNNA, NEW JERSEY, ASSIGNOR TO HERCULES POWDER COMPANY, OF WILMINGTON, DELAWARE, A CORPORATION OF DELAWARE

COMPOSITION OF MATTER

No Drawing. Application filed August 8, 1930. Serial No. 474,067.

My invention relates to a new composition of matter comprising more particularly the nitration product of an optically active isomer of inositol.

Inositol, a polyhydric alcohol, belongs to the cycloses, which form a connecting link between the sugars and the aromatic benzene ring derivatives and may be regarded chemically as derivatives of hexamethylene or hexahydrobenzene.

Inositol, or hexahydroxyhexamethylene, has the following formula:

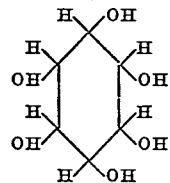

Of the various possible arrangements of the H and OH groups in the above formula there are two optically active isomers, the optical antipodes, d-inositol and l-inositol. D-inositol may be prepared, for example, from pinite, its monomethyl ether, which occurs in the resin and leaves of various plants, as for example, Pinus lambertiana, senna leaves and Madagascar rubber plant and l-inositol may be prepared, for example, from quebrachitol, $C_6H_6(OH)_5(OCH_3)$, its monomethyl ether, an unmarketable material, which, for example, occurs in quebracho bark and is also, for example, found in rubber latex, from which it is obtained in large quantities as a waste by-product. Quebrachitol, having the formula $C_6H_6(OH)_5(OCH_3)$ and crystallizing in prisms, melts at 186° C.–187° C., is soluble in water, less soluble in alcohol and insoluble in ether.

By way of illustration, for example l-inositol may be prepared by mixing 75 parts of quebrachitol with 100 parts of hydroiodic acid, sp. gr. 1.70, placing the mixture in a long neck flask, provided with suitable tube for conducting the gas away, and heating in a glycerin bath to 130° C.–140° C. After one hour the temperature is raised slightly and the reaction allowed to continue for about three hours. After the reaction is complete the material is poured into a suitable container, and allowed to crystallize. The crystals are then ground in a mortar, washed with ethyl alcohol or ether and dissolved in water. The water solution is then filtered through activated carbon, evaporated under vacuum to a syrup, cooled and the inositol precipitated as crystals by adding ethyl alcohol containing 10% ether. Further purification of the inositol may be effected by subsequent recrystallization if desired. The reaction may be illustrated as follows:

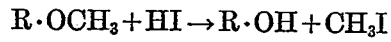

The d-inositol may be prepared in a similar manner using pinite instead of quebrachitol.

Now, in accordance with my invention, I have found that if an optically active isomer of inositol be nitrated, desirably to the hexanitrate, a new composition of matter will be produced which will have various desirable and valuable characteristics, rendering it adaptable for various uses, for example, as an explosive, either alone or in connection with nitric esters, and nitrocompounds, as an ingredient of smokeless powders, as a gelatinizing agent for nitrocotton and for other purposes.

The new composition of matter according to my invention is very soluble in acetone, in concentrated sulfuric acid, in methyl alcohol and in ether. When dropped on a heated plate it flashes, but does not explode though it may be detonated with a commercial blasting cap.

The new composition may be used in combination with nitric esters and other nitrocompounds and hence it provides a new and useful ingredient for explosives. The new composition of matter also has the capacity for gelatinizing nitrocotton and lends itself admirably for use as an ingredient of smokeless powder.

In the preparation of the new composition of matter, for example, twenty (20) parts of an optically active isomer of inositol, for example, prepared from quebrachitol, is added, in a suitable nitrating apparatus, to one hundred (100) parts of a nitrating mixture, i. e. mixed nitric and sulfuric acid, at a temperature of about 45° F. The mixture is agitated in a nitrating apparatus provided with suitable cooling means, as a cooling jacket, and the temperature of the mixture is permitted to rise to about 70° F., the mixture is then cooled to about 55° F., the cooling medium is then cut off and the temperature will rise to about 65° F. and will remain constant. The inositol is preferably added to the nitrating mixture gradually and the agitation of the mixture is continued for about sixty (60) minutes after all the inositol is added. The mixture is then placed in a separator where it is permitted to stand for about fifteen minutes, after which my new composition of matter, a large amount of which will come to the surface, is skimmed off and placed in cold water. The spent acid remaining in the separator and which is cloudy, may then be drowned in cold water for the recovery of a further quantity of the new composition of matter, which is added to that previously obtained by skimming.

The new composition of matter is separated from the water and re-washed with fresh water, neutralized by washing with a dilute alkali solution, as a dilute solution of sodium carbonate, washed with fresh water and dried. The product will have a nitrogen content of about 18.30%, as compared with 18.672% theoretical.

The nitration reaction may be diagrammed as follows:

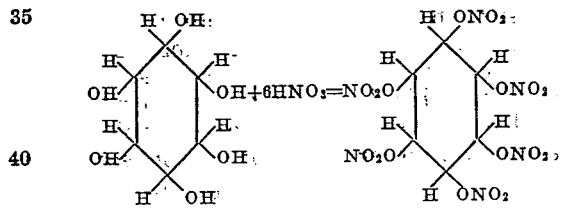

As has been indicated my new composition of matter may be used in explosives in connection with nitric esters and nitrocompounds and may be produced simultaneously with the production of a nitric ester of another compound, such, for example, as nitroglycerine, nitroglycol, nitrostarch, nitrosugar, and the like.

By way of illustration, twenty (20) parts of an optically active isomer of inositol are mixed with eighty (80) parts of glycerine and the mixture nitrated with the same mixed acids and in the same manner as used for nitrating glycerin. The finished product will have a nitrogen content of 18.41% and is little, if any, more viscous than is nitroglycerine and does not suffer from the disadvantage of high viscosity characteristic of nitrosugar-nitroglycerine products. The product, a desirable explosive, is stable, has a pH value of 7.0 after standing for four weeks and has a KI test of twelve minutes at 82.2° C.

In connection with the gelatinizing effect of my new composition of matter on nitrocellulose, as for example, nitrocotton, flow tests with 98.5% nitroglycerine, 1.5% nitrocotton and 98.5% of a mixture of 80% nitroglycerine and 20% inositol nitrate and 1.5% nitrocotton shows that inositol is superior to nitroglycerine in colloiding power.

It will be understood that my invention, from the broad standpoint, contemplates a new composition of matter comprising the nitration product of an optically active isomer of inositol irrespective of the source of the optically active isomer, or of the method of nitration.

Having now fully described my invention, what I claim and desire to protect by Letters Patent is:

1. As a new composition of matter, the nitration product of an optically active isomer of inositol.

2. As a new composition of matter, the nitration product of l-inositol.

3. As a new composition of matter, the nitration product of d-inositol.

In testimony of which invention, I have hereunto set my hand, at Kenvil, N. J., on this 4th day of August, 1930.

WILLARD DEC. CRATER.